Aug. 3, 1948.    G. L. MEYERS ET AL    2,446,380
FLUID SEAL
Filed April 12, 1945
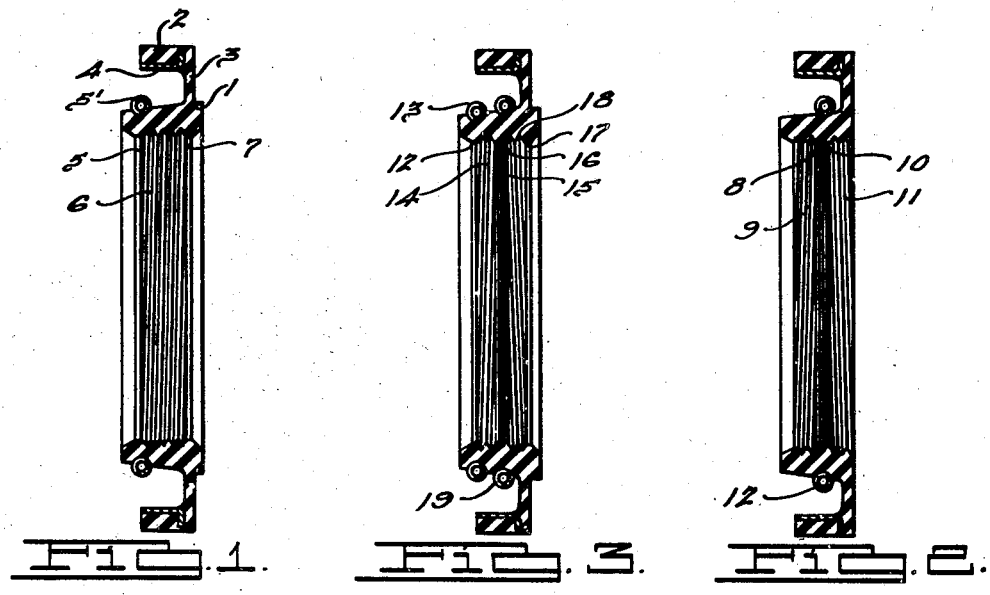
INVENTORS.
George L. Meyers,
John C. Shutt.
BY
Harness, Dickey & Pierce
ATTORNEYS.

Patented Aug. 3, 1948

2,446,380

UNITED STATES PATENT OFFICE 2,446,380

FLUID SEAL

George L. Meyers, Willoughby, and John C. Shutt, Wickliffe, Ohio, assignors to The Ohio Rubber Company, Willoughby, Ohio, a corporation of Ohio Application April 12, 1945, Serial No. 587,908

2 Claims. (Cl. 288—2)

The present invention relates to a shaft seal adapted to seal the joint between a rotating shaft and a housing against the leakage of liquids and the entrance of dirt or other foreign material.

It is the general object of the invention to provide a seal of the above type formed from a yielding rubber-like plastic material incorporating means which, upon relative rotation between the seal and the cooperating sealing surface, is effective to apply an opposing force either to the leakage of a liquid in one direction or to the entrance of foreign material from the opposite direction, or both.

Another object of the invention is to provide an improved seal of the above mentioned type which is effective to seal against a slight pressure tending to cause leakage.

Other objects and advantages of the invention will become apparent from the following specification, the accompanying drawings, and the appended claims.

In the drawings, Figures 1, 2, and 3 are transverse, sectional views through three different embodiments of the principles of the invention, as applied to a shaft seal adapted to co-operate with a rotating cylindrical shaft.

In its broadest aspect, the present invention resides in a seal molded from yielding rubberlike material and provided on its sealing face with the combination of a sharp, V-shaped, helical thread adapted to contact at its apex the co-operating sealing surface on a shaft and one or more continuous annular lips positioned alongside of the threaded area and likewise adapted to engage the shaft surface. The continuous annular lip is preferably provided with a sealing surface of appreciable width which closely fits and is preferably yieldingly forced into contact with the cooperating sealing surface to resist the leakage of liquid past the seal. Such an arrangement of the sealing lip is fairly satisfactory alone, but on relative movement between the sealing lip and the shaft a film of liquid will form between the two, and if there is any difference in pressure at opposite sides of the seal resulting from the force of gravity or otherwise there is a tendency of the liquid to leak past the lip. In accordance with the present invention, this tendency is opposed by the action of the threaded portion of the seal, since the V-shaped threads are inclined in such a direction with respect to the relative rotation of the seal and the co-operating sealing surface that they tend to force liquid in a direction opposite to the direction of leakage.

An important feature of the invention resides in the employment of sharp, V-shaped threads, the apexes or points of which engage the shaft. As a result of this arrangement there is no appreciable area of contact between the threads and the co-operating sealing surface or shaft, and consequently the threads will penetrate any liquid film, and contact the shaft. They are assisted in the performance of this function by the continuous annular lip, since it serves to properly space or locate the threads with respect to the sealing surface, and therefore insures that they will make proper contact and will not be materially distorted by such contact. While the threads are exceedingly narrow at their apexes, they are not deflected laterally to a detrimental extent by the liquid, for the reason that there is a substantially balanced pressure at both sides of each thread. The threaded areas of the seal are preferably formed with a single continuous helical or spiral thread but a multiple thread may be used.

The V-shaped threaded areas may be positioned on either side of the continuous liquid sealing lip. If they are on the liquid side of the continuous annular lip they perform the function of relieving that lip of the pressure of the liquid. If they are on the opposite side they impose a counterpressure on the lip which will balance a pressure at the liquid side of the lip and hence prevent leakage. In addition to the primary liquid sealing lip mentioned, it is desirable, although not necessary, to provide an additional continuous annular sealing lip at the opposite side of the threaded area to assist the first lip in controlling the position of the threads with respect to the co-operating sealing surface.

In addition to the above features the invention contemplates the incorporation of means to prevent the entrance of dirt from the nonliquid side of the seal. This may be accomplished either by an auxiliary dirt sealing lip or by an oppositely inclined threaded portion, or both, depending upon the degree of protection required.

In Figure 1 of the drawings there is illustrated in section, one embodiment of the principles outlined above. The seal illustrated in Figure 1 is adapted to co-operate with a cylindrical shaft and is designed to prevent a leakage of liquid from the left-hand side of the seal, as viewed in the drawing, to the right-hand side and at the same time prevent the entrance of dirt from the right-hand side. The seal is formed by molding a suitable rubberlike plastic material into a one-piece annular body 1 having an attaching flange 2 radially spaced therefrom, and a connecting radial web 3 of relatively thin section. A ring 4 of metal or other relatively hard material is embedded in the flange 2 and is adapted to have a press fit on the stationary portion of the shaft housing in the usual manner. It will be appreciated that the ring 4 may, if desired, be exposed at the outer periphery of the flange and thus be adapted to make an internal press fit if desired. The thin radial section 3 permits limited radial and axial movements of the main body portion 1 of the seal with reference to the attaching member 4, to accommodate misalignment and minor movements of the shaft which is to be sealed.

The inner face of the body portion 1 of the seal is provided at the left-hand side with a continuous annular sealing lip 5 adapted to contact the shaft. It will be noted that the sealing lip 5 has a sealing face of appreciable width and that it is resiliently held in sealing engagement with the shaft by means of a garter spring 5' in the usual manner. The sealing face of the body of the seal is likewise provided with a sharp V-shaped threaded portion 6, the V-shaped threads lying in a helical path and hence at a slight angle to the lip 5. The apexes or points of the V-shaped threads lie in approximately the same plane as the sealing face 5 and hence are adapted to contact the shaft engaged by the lip 5.

The seal illustrated in Figure 1 is adapted for use on a shaft which rotates in a counterclockwise direction, as viewed from the left of Figure 1. Consequently, the threads 6 extend at such an angle that they tend to feed any liquid which leaks past lip 5 back toward the lip. This results in building up a counterpressure at the right side of the sealing lip 5, which will effectively oppose any tendency to leakage past the lip. The V-shaped threads are formed with sharp shaft-engaging points and are preferably made quite small so that any liquid in the space between the threads will tend to be carried around the seal by the rotating shaft.

It will be noted that in the embodiment of Figure 1 the sealing lip 5 is located on the liquid side of the threaded portion of the seal. Accordingly there is provided an auxiliary sealing lip 7 similar to the lip 5 but which serves to keep dirt from entering the threaded portion 6 and being fed thereby past the sealing lip 5 and into the housing. The auxiliary sealing lip 7, being located at the opposite side of the threaded portion 6, also assists the lip 5 in properly locating the threaded portion with respect to the co-operating shaft.

In Figure 2 is illustrated another embodiment of the invention with a continuous annular oil sealing lip 8 located at the opposite side of a threaded portion 9 from the left-hand or liquid side of the seal. With this arrangement, as indicated above, the threaded section 9 serves to relieve liquid pressure on the sealing lip 8 and hence to prevent leakage of liquid. The seal of Figure 2 likewise incorporates an auxiliary dirt sealing lip 10 in combination with a threaded portion 11 having threads inclined in a helix in an opposite direction to that of the helical threads 9. As a result the lip 10 and the threaded portion 11 serve to prevent the entrance of dirt to the housing. In that connection the threaded portion 11 actually tends to feed dirt outwardly of the housing if any should enter during the time that the rotary shaft is stationary. It will be noted that the sealing lips 8 and 10 are held in contact with the shaft by means of a single garter spring 12. In all other respects the construction shown in Figure 2 is similar to that illustrated in Figure 1.

In Figure 3 a further embodiment of the invention adapted for use under more severe conditions is illustrated. In the construction of Figure 3 the seal is provided with an internal continuous annular liquid sealing lip 12 in combination with a garter spring 13 and a helical threaded portion 14 positioned on the right-hand side of the lip 12 in the manner illustrated in Figure 1. In addition, however, the seal is provided with a pair of central sealing lips 15 and 16, an outer sealing lip 17, and an intermediate threaded portion 18, which is threaded in an opposite helix to that of the threaded portion 14. In this construction the lip 12 and thread 14 serve to prevent leakage of liquid; the lip 17 and threaded portion 18 serve to prevent the entrance of foreign material; and the central lips 15 and 16, which are preferably held in engagement with the shaft by means of a garter spring 19, are supplementary sealing lips whose principal function is to assist in controlling the location of the threaded portions 14 and 18 with respect to the shaft.

It will be apparent that the seal of Figure 3 may be modified by omitting the sealing lip 12 and the garter spring 13 if desired, in which event the continuous annular lip 15 becomes the liquid sealing lip. Alternatively, the seal of Figure 3 may be modified by omitting the external lip 17.

While several modifications of the invention have been illustrated and described, it will be apparent that other modifications may be made in the design and construction without departing from the spirit of the invention as set forth herein.

What is claimed is:

1. A shaft seal comprising an annular mounting section and an annular shaft engaging section formed of one piece of yieldable rubber-like material with a relatively thin connecting portion between the sections to permit radial movement of one section relative to the other, said shaft contacting section having an internal surface provided with a V-shaped helical thread, the apex of which is adapted to contact the shaft, and also having an annular shaft engaging sealing surface of appreciable width adapted to maintain the apex of the thread in contact with the shaft and prevent distortion of the thread by excessive contact pressure.

2. A shaft seal comprising an annular mounting section and an annular shaft engaging section formed of one piece of yieldable rubber-like material with a relatively thin connecting portion between the sections to permit radial movement of one section relative to the other, said shaft contacting section having an internal surface provided with a V-shaped helical thread, the apex of which is adapted to contact the shaft, and also having a pair of annular shaft engaging sealing surfaces of appreciable width on opposite sides of said thread adapted to maintain the apex of the thread in contact with the shaft and prevent distortion of the thread by excessive contact pressure.

GEORGE L. MEYERS.
JOHN C. SHUTT.

REFERENCES CITED

The following references are of record in the file of this patent:

UNITED STATES PATENTS

| Number | Name | Date |
|---|---|---|
| 1,208,045 | Swart et al. | Dec. 12, 1916 |
| 1,212,089 | Miller et al. | Jan. 9, 1917 |
| 1,291,397 | Cantrell et al. | Jan. 14, 1919 |
| 1,991,614 | Jonn et al. | Feb. 19, 1935 |
| 2,188,858 | Chievitz | Jan. 30, 1940 |
| 2,373,443 | Armington | Apr. 10, 1945 |

FOREIGN PATENTS

| Number | Country | Date |
|---|---|---|
| 799,867 | France | 1936 |